Patented Apr. 24, 1928.

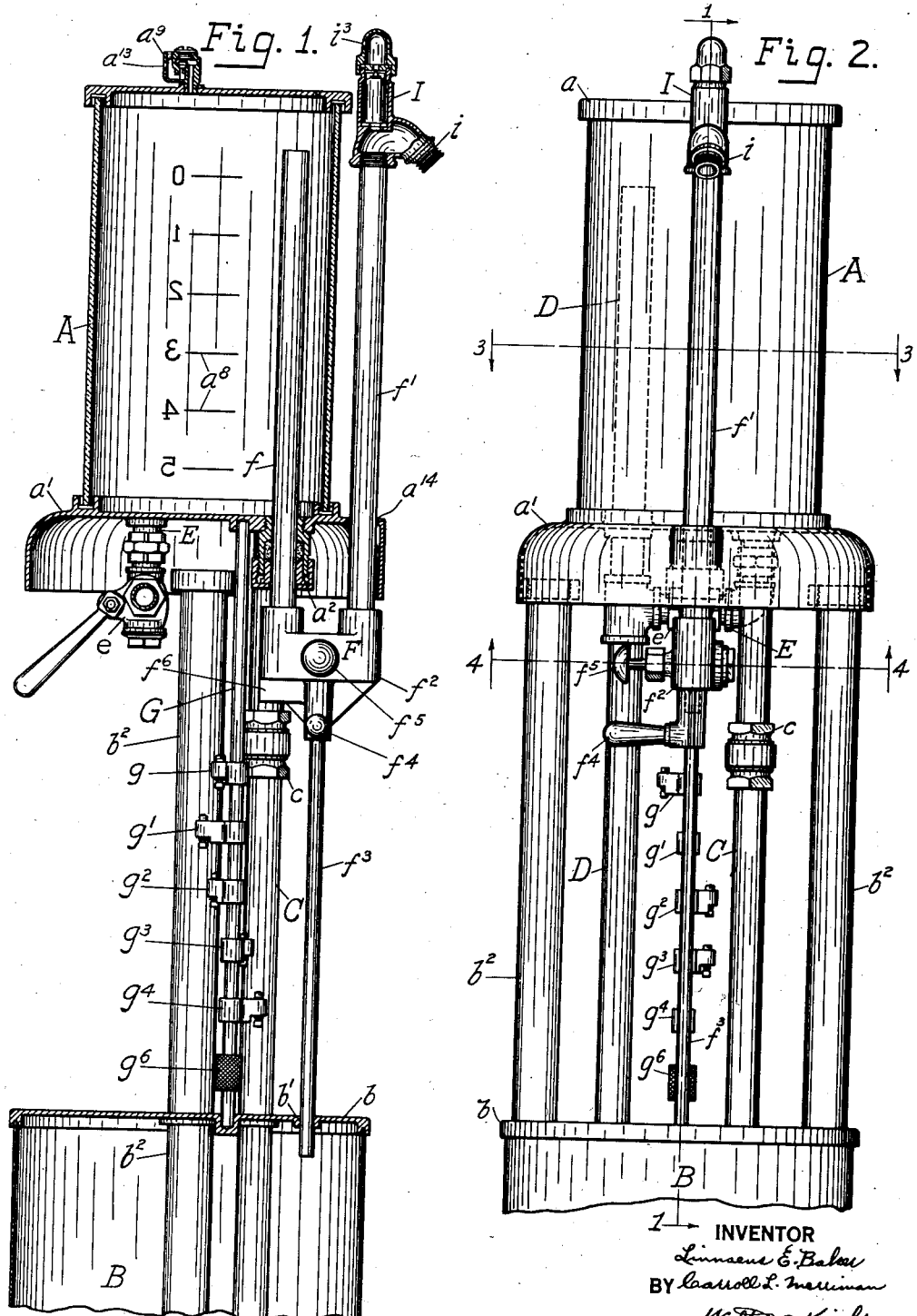

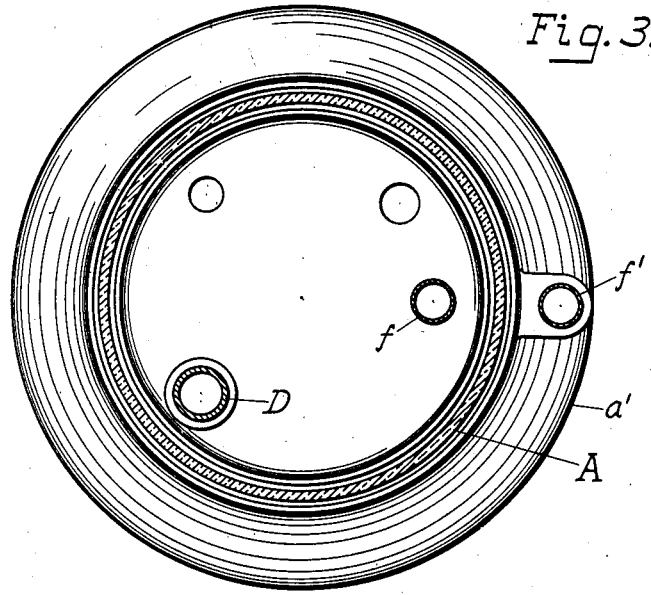
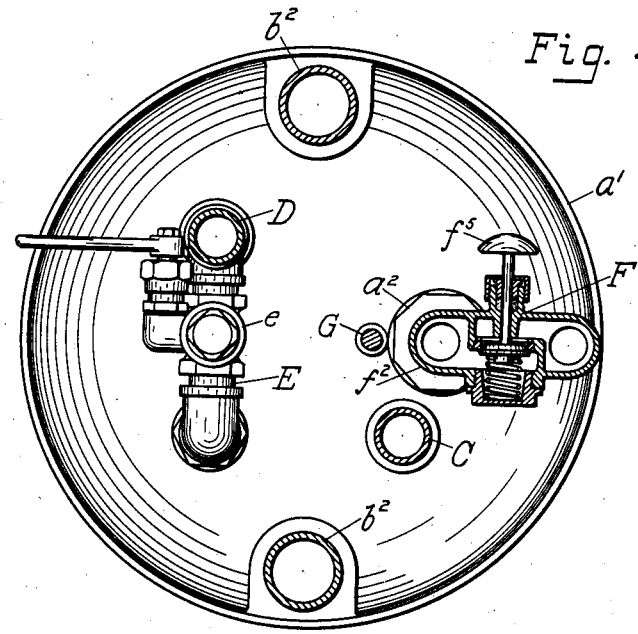

1,667,137

UNITED STATES PATENT OFFICE.

LINNAEUS E. BAKER AND CARROLL L. MERRIMAN, OF FORT WAYNE, INDIANA, ASSIGNORS TO WAYNE COMPANY, OF FORT WAYNE, INDIANA, A CORPORATION OF INDIANA.

LIQUID MEASURING AND DISPENSING APPARATUS.

Application filed July 24, 1924. Serial No. 727,987.

Our invention relates to liquid measuring and dispensing apparatus of the so-called visible type, used particularly in selling gasoline.

The visible container is preferably provided with a fixed drain-back pipe and the container is adapted to be filled above the level of said pipe and thereafter immediately automatically drains back therethrough to zero on the scale usually provided in connection with said container. It is also provided with an adjustable tube on the serve side of the apparatus so that if from a five gallon container the purchaser desires to buy two gallons of liquid, the container may be filled, the adjustable tube brought down to the proper level, the serve valve opened and the liquid drained from the container to the two-gallon level. If the customer then orders another gallon, the tube is lowered accordingly and the additional gallon dispensed, the serve tube being then at the three gallon level, and so on until the customer's tank is filled or the container emptied, all without re-filling the container in whole or in part. Each such measurement will be accurate.

The principal object of our invention is to provide a new and improved apparatus of the character indicated, which will measure with accuracy different desired quantities of the liquid to be dispensed, it being possible to dispense a plurality of separate quantities, the sum of which is within the capacity of the container, without re-filling the said container.

Another object of our invention is to provide an apparatus of few and simple parts, every operation of which is within plain view of the customer.

Our invention is illustrated in the accompanying drawings, in which:—

Figure 1 is a gasoline measuring and dispensing apparatus in vertical section on the line 1—1 of Fig. 2, the fill pipe, drain-back pipe, serve tube and attendant valves being shown in full, the bottom part of the casing and fill pipe and support being broken away.

Fig. 2 is an elevation on the serve tube side of the apparatus with the bottom part of the casing broken away.

Fig. 3 is a horizontal cross section on the line 3—3 of Fig. 2, and

Fig. 4 is a horizontal cross section on the line 4—4 of Fig. 2.

Referring now to the drawings:—

A is the elevated visible container made of glass or other transparent material with top $a$ vented at $a^9$ and with bottom $a^1$. The container A is provided with graduations $a^8$ to indicate by the level of the liquid being dispensed from said container the number of gallons served.

The structure is supported upon a suitable base B and supports $b^2$, $b^2$. Gasoline is forced from the source of supply (not shown) by any suitable means (not shown) through the fill pipe C into the visible container A, filling it. Return flow is prevented by the check valve $c$. Excess liquid in the container A is drained back to the source of supply through the open-ended overflow pipe D, terminating on a level with the zero graduation on the scale. All liquid can be drained from the container A to the overflow pipe D through the drain-back pipe E, flow controlled by the valve $e$. With the level of the liquid standing at the maximum serving level, that is, zero, five gallons in this apparatus, the operator is ready to serve gasoline to a customer.

Through the container bottom $a^1$ extends the inlet branch $f$ of the U-tube F, which branch is provided with a stuffing box $a^2$ to make a leak-tight joint, and is open-ended at the top to allow liquid to flow into it from the contents of the container. The other branch $f^1$ of the U-tube F forms the liquid outlet, is open-ended; and the branches $f$ and $f^1$ are parallel with each other and preferably terminate above at substantially the same height. Branches $f$ and $f^1$ terminates below the stuffing box $a^2$ in a connecting member $f^2$, which forms the bottom of the U-tube F and together with branches $f$ and $f^1$ forms a continuous conduit for the flow of liquid from the container A down through the pipe $f$ over through the connecting member $f^2$ up through the branch $f^1$ and out to the hose connection $i$ through a vented drain valve fitting I of any usual type.

The U-tube member has secured to the bottom of its connecting member $f^2$ a guiding rod $f^3$ parallel with the tubes $f$ and $f^1$. This rod is guided through a hole $b^1$ in the head $b$ of the base B. It is also guided through a hole $a^{14}$ in the container bottom $a^1$. A handle $f^4$ is provided by which the U-tube F is vertically adjusted. A valve $f^5$ in the connecting member $f^2$ keeps the passage between the lower ends of the tubes $f$ and $f^1$ normally closed, and this passage may be opened by manipulation of said valve. Quantity stop mechanism of any convenient form is provided to limit the downward movement of the U-tube F. The mechanism shown consists of a quantity stop rod G with a knurled handle $g^6$, by which it is rotated, and stops $g$, $g^1$, $g^2$, $g^3$ and $g^4$ thereon to limit the depression of the U-tube F by contact with the lug $f^6$, so as to limit the quantity of gasoline dispensed to 1, 2, 3, 4 or 5 gallons respectively. While in service, for accurate measurement, the U-tube member F always remains full of gasoline.

The vent hole $i^3$ in the drain valve I and the vent hole $a^{13}$ in the container vent fitting $a^9$ maintain atmospheric pressure at all times on the surfaces of the liquid in the U-tube F and container A respectively to insure the same level of liquid in the tube as in the container at the completion of any delivery for which the U-tube F is set.

Many changes may be made in this apparatus without departing from the spirit of our invention. If the valve $f^5$ in the U-tube F is omitted, it does not affect the accuracy of measurement attained and if so constructed, the flow of liquid being dispensed, may at any time be quickly arrested by elevating the U-tube F.

The operation of the apparatus is as follows:

Assume that the particular apparatus has never been in use; force gasoline into the container A until it is filled to above the level of overflow pipe D, the U-tube F being in any position desired, for instance, in the position shown in Figs. 1 and 2, which is extreme raised position. The tube $f$ will fill with gasoline to the valve $f^5$, then open the valve $f^5$ and lower the U-tube F until it is filled with gasoline and overflows through the hose connection $i$. The U-tube F being now full of gasoline, let us suppose that a customer comes and orders three gallons of gasoline. The container A may be filled, that is, until when all excess gasoline has run back to storage through the overflow pipe D, the top level of gasoline in the container A stands at O, that is, showing five gallons in the container ready to be served. The operator grasps the handle $g^6$ and rotates the stop rod G until the stop $g^2$ lies in the vertical path of the lug $f^6$. Then the operator grasps the handle $f^4$ and lowers the U-tube F until the lug $f^6$ contacts with the stop $g^2$ and will not permit the U-tube to be lowered further. The operator now opens the valve $f^5$ and holds it open until the gasoline has drained out through the hose to the customer's car, so that the top level of the gasoline in the container is at 3 on the scale. If the customer then orders another gallon the stop rod G is rotated until the stop $g^3$ is in the path of the lug $f^6$. The U-tube F is further lowered until said lug contacts with said stop and valve $f^5$ is again opened and held open until another gallon has been served; and so on.

When the container A is to be drained back to storage the U-tube F may be left in any position, the valve $e$ is opened and kept open until the gasoline in the container A has all drained back through the drain-pipe E and through the overflow pipe D to the source of supply.

We claim as our invention and desire to secure by Letters Patent of the United States:—

1. In combination with a liquid measuring and dispensing apparatus having an elevated container from which liquid is dispensed, a U-tube slidably adjustable in a vertical plane and having branches of substantially the same height and having the inlet branch open at the top, a stuffing box in the bottom of said container through which said inlet branch passes, said inlet branch terminating within said container, the outlet branch of said U-tube being formed for use in serving customers.

2. In combination with a liquid measuring and dispensing apparatus having an elevated container from which liquid is dispensed, a rigid U-tube slidably adjustable in a vertical plane and having branches of substantially the same height and having the inlet branch open at the top, a stuffing box in the bottom of said container through which said inlet branch passes, said inlet branch terminating within said container, the outlet branch of said U-tube being formed for use in serving customers, and means for equalizing the pressures on the surface of the liquid in the container and outlet branch of the U-tube.

3. In combination with a liquid measuring and dispensing apparatus having an elevated container from which liquid is dispensed, a rigid U-tube slidably adjustable in a vertical plane and having branches of substantially the same height and having the inlet branch open at the top, a stuffing box in the bottom of the container through which said inlet branch passes, said inlet branch terminating within said container, the outlet branch of said U-tube being formed for use in serving customers, a valve controlling the flow of liquid through said U-tube, and means for equalizing the pressures on the surfaces of the liquid in the container and outlet branch of the U-tube.

4. In combination with a liquid measuring and dispensing apparatus having an elevated container from which liquid is dispensed, a rigid U-tube slidably adjustable in a vertical plane and having branches of substantially the same height and having the inlet branch open at the top, a stuffing box in the bottom of the container through which said inlet branch passes, said inlet branch terminating within said container, the outlet branch of said U-tube being formed for use in serving customers, a valve controlling the flow of liquid through said tube, said outlet branch being vertically adjustable so that its outlet end may take any position even with or below the effective top and to the bottom of the container, whereby the container may be completely drained or drained to different levels by adjusting the vertical height of said outlet tube.

6. In combination with a liquid measuring and dispensing apparatus having an elevated container from which liquid is dispensed, a rigid U-tube slidably adjustable in a vertical plane and having branches of substantially the same height and having the inlet branch open at the top, a stuffing box in the bottom of the container through which said inlet branch passes, said inlet branch terminating within said container, the outlet branch of said U-tube being formed for use in serving customers, and stop mechanism to control the extent to which said tube shall be lowered to insure the dispensing of the quantity of liquid desired.

7. In combination with a liquid measuring and dispensing apparatus having an elevated container from which liquid is dispensed, a rigid U-tube slidably adjustable in a vertical plane and having branches of substantially the same height and having the inlet branch open at the top, a stuffing box in the bottom of the container through which said inlet branch passes, said inlet branch terminating within said container, whose outlet branch terminates upwardly in vented means secured to the top of said tube and formed a cap for the latter and a conduit used to serve customers, a valve controlling the flow of liquid through said tube, said outlet branch being vertically adjustable so that its outlet end may take any position even with or below the effective top and to the bottom of the container, whereby the container can be completely drained or drained to different levels, by adjusting the vertical height of said outlet branch.

8. In combination with a liquid measuring and dispensing apparatus having an elevated container from which liquid is dispensed, a U-shaped element slidably adjustable in a vertical plane, the vertical branches of said element being connected at the bottom, said element of itself forming a conduit used in serving customers.

9. In combination with a liquid measuring and dispensing apparatus having an elevated container from which liquid is dispensed, a U-shaped element slidably adjustable in a vertical plane, the vertical branches of said element deing connected at the bottom, said element of itself forming a conduit used in serving customers, and a valve in said U-shaped element adapted to control the flow of liquid therethrough.

In testimony whereof we have hereunto set our hands.

LINNAEUS E. BAKER.
CARROLL L. MERRIMAN.